United States Patent [19]

Ma

[11] 4,146,751
[45] Mar. 27, 1979

[54] SOLID STATE PULSING APPARATUS FOR PULSING SELECTED LINE RELAY TERMINALS

[75] Inventor: Raymond Ma, Seattle, Wash.

[73] Assignee: Tel-Tone Corporation, Kirkland, Wash.

[21] Appl. No.: 848,823

[22] Filed: Nov. 7, 1977

[51] Int. Cl.$^2$ ............................................ H04M 3/42
[52] U.S. Cl. ................................................ 179/16 EC
[58] Field of Search ............ 179/1 PC, 16 A, 16 AA, 179/16 EC, 18 EB, 18 F, 18 FA

[56] References Cited

U.S. PATENT DOCUMENTS

| | | | |
|---|---|---|---|
| 2,875,278 | 2/1959 | Lueders | 179/1 PC |
| 3,453,391 | 7/1969 | Hubbell | 179/16 EC |
| 3,818,144 | 6/1974 | Druyff et al. | 179/16 EC |
| 4,093,826 | 6/1978 | Koster | 179/16 EC |

*Primary Examiner*—Kathleen H. Claffy
*Assistant Examiner*—Randall P. Myers

*Attorney, Agent, or Firm*—Christensen, O'Connor, Johnson & Kindness

[57] ABSTRACT

A solid state pulsing circuit and an adapter connector for pulsing the counting and register advance terminals of the L-(line) relay of an originating register in accordance with the digit nature of received DTMF signals is disclosed. The pulsing circuit includes a pair of solid state switches adapted to be alternatively actuated and the adapter connector connects the pulsing circuit to the counting and register advance terminals of the line relay without affecting the normal operation of the relay. Complementary MAKE and BREAK signals derived from the serial pulse output of a DTMF receiver operate the solid state pulsing circuit such that the pulsing circuit alternately pulses (opens and grounds) the counting and register advance terminals of the line relay in accordance with the production of pulses by the DTMF receiver. Other relay terminals (i.e., the terminals controlling the slow release supervisory relay adapted to detect the ON HOOK state of a subscriber's telephone) are not pulsed, whereby annoying line clicks are avoided.

9 Claims, 1 Drawing Figure

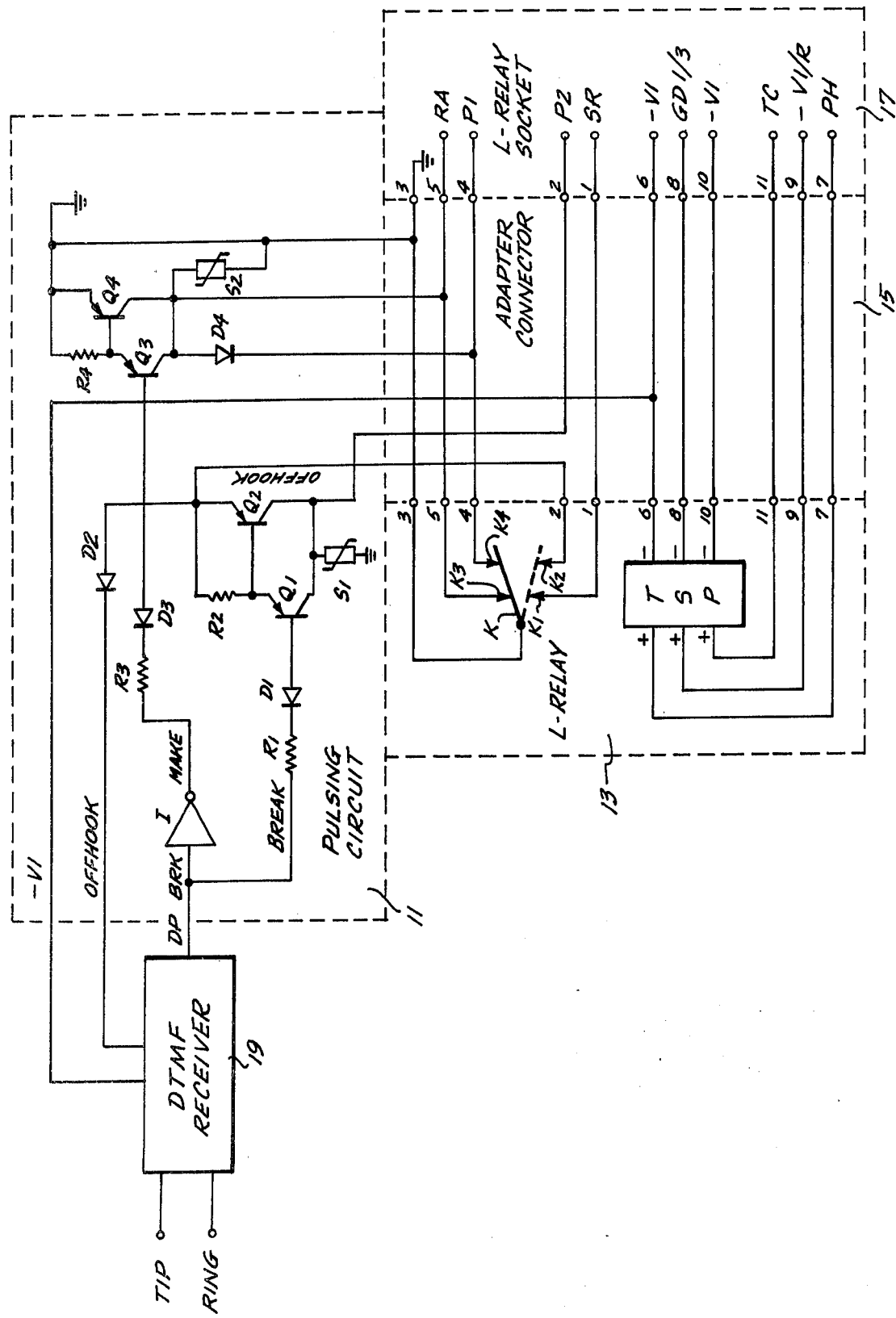

SOLID STATE PULSING APPARATUS FOR PULSING SELECTED LINE RELAY TERMINALS

BACKGROUND OF THE INVENTION

This invention is directed to telephone communications systems and, more particularly, circuitry useful in coupling DTMF receivers to pulsing relays, particularly pulsing relays used in orginating registers, such as the "L" relay used in a #5 Crossbar Originating Register.

In many environments where it is necessary to convert dual tone multifrequency (DTMF) signals of the type produced by a pushbutton telephone into rotary dial type pulses, a tone-to-pulse converter (DTMF receiver) provides an output that splits the tip and ring lines during a conversion sequence. During conversion, the DTMF receiver receives and converts DTMF signals into rotary dial type pulses and the pulses are outpulsed beyond the line split. However, in certain environments, this arrangement is unsatisfactory. Specifically, attempts to use this arrangement is certain central office equipment, such as a #5 Crossbar Originating Register, results in the production of annoying line clicks on a subscribers line due to line splitting by the tone-to-pulse converter. Other service related problems can also occur. For example, coin telephone and tip-party interrogation signals from the originating register can be partially or entirely blocked during the line split period of time.

One proposal to overcome the foregoing disadvantage is to avoid splitting the line and pulsing the primary winding of the line relay (commonly referred to as the L-relay) of the originating register. (The line or L-relay is the relay having a primary winding that responds to rotary dial pulses and, in accordance with the receipt of rotary dial pulses, opens and closes relay contacts connected to pulse count (e.g., P) relays, which form a dial pulse counter.) This proposal also has disadvantages. Specifically, pulsing the primary winding of the line relay based on the output of a DTMF receiver results in the production of a system that is incompatible in some instances with some of the test equipment normally associated with such central office equipment, such as the Automatic Monitor Register and the Sender Test Circuit, commonly known as the Master Test Frame.

In order to overcome the test equipment incompatability problem pulsing of the contact terminals (rather than the primary winding) of the L-relay in a manner that simulates the exact way an L-relay responds to rotary dial pulses has been proposed. While this solution overcomes the disadvantages of pulsing the primary winding of the L-relay, it produces other problems. Specifically, pulsing all of the contact terminals of the L-relay, in the same manner as they would be opened and closed by rotary dial pulses pulsing the primary winding of the L-relay, results in the creation of undesirable clicks or pops on the telephone line. Because the clicks or pops are audible to the subscriber, service complaints are likely to occur. Thus, this proposed solution is also unsatisfactory.

Therefore, it is an object of this invention to provide an apparatus for coupling a DTMF receiver to an originating register in a manner such that the functional operation of the originating register, including the functional operation of items such as the Master Test Frame, is not inhibited and in a manner such that undesirable subscriber audible signals are not produced.

It is another object of this invention to provide a tone adaptor pulsing circuit for pulsing the terminals of a line or L-relay in a manner such that undesirable subscriber audible signals are not produced.

It is a still further object of this invention to provide a tone adaptor pulsing circuit suitable for pulsing the terminals of a line or L-relay in a manner that simulates the dial pulse counting action that would occur if the primary winding of the relay were pulsed by dial pulses, without creating undesirable audible effects.

SUMMARY OF THE INVENTION

In accordance with principles of this invention, a solid state pulsing circuit for pulsing (grounding and opening) the counting and register advance terminals of a line relay of the type used in an originating register is provided. The terminals are pulsed in response to pulses produced by a DTMF receiver, the pulses being related to the nature of tones received by the DTMF receiver. The pulsing circuit is connected to the terminals of the line relay and its socket by an adapter connector mounted between the L-relay and its socket. The pulsing circuit pulses the counting and register advance terminals of the line relay in a manner similar to the way these terminals are pulsed when the L-relay responds to rotary dial pulses. More specifically, MAKE and BREAK signals based on the series pulse chain produced by the DTMF receiver in response to the receipt of a valid DTMF signal control a pair of solid state grounding switches included in the pulsing circuit. The pulsing circuit is controlled in a manner such that the switches are alternately actuated. The switches open and ground the terminals of the L-relay that control counting in the same manner that the terminals would be open and grounded if the primary winding of the L-relay were operated by a series of pulses produced by a rotary dial telephone. The switches also open and ground the register advance terminal (which controls the transfer of pulse counts to a storage register) in the same way that the register advance terminal in open and grounded by a series of rotary dial pulses. Only the counting and register advance terminals of the L-relay are connected to the switches. Relay terminals adapted to control other functions, i.e., the operation of the slow release supervisory (SR) relay, which is directly connected to the secondary winding of the L-relay and indirectly connected to the tertiary winding of the L-relay, are not pulsed. Because the secondary and tertiary windings are not pulsed directly or indirectly, annoying pulse clicks or pops on the subscribers line do not occur. However, the supervisory (SR) relay is still under the direct control of the L-relay. (As is well known to those skilled in the telephone arts, the SR relay detects the ON-HOOK state of a subscribers telephone.)

The preferred form of the pulsing circuit comprises two transistor switches, which are controlled in a complementary manner by the output of the DTMF receiver. That, is one switch is open during the BREAK period of the output of the DTMF receiver and the other switch is closed. During the MAKE period the first switch is closed and the second switch is open. The first transistor switch is connected in series with the wiper and contact of the L-relay controlling the P2 counting terminal of the L-relay and the second transistor switch is connected in parallel with the wiper and contact of the L-relay controlling the P1 counting terminal of the L-relay. In addition, the second transistor switch is connected in parallel with the wiper and contact of the L-relay controlling the register advance (RA) terminal of the L-relay. As noted above, the RA terminal controls the operation of a register advance relay that shifts a dial pulse count from the P1/P2 actuated counter to a register.

The solid state pulsing circuit of the invention overcomes the disadvantages of prior art approaches to coupling a DTMF receiver to an originating register of central office equipment that cannot operate satisfactorily if the tip and ring lines are split during a tone-to-pulse conversion sequence. Because only selected terminals of the L-relay (e.g. the counting and register advance terminals) are pulsed, undesirable line clicks or pops are avoided. Moreover, because the terminals are pulsed directly, as opposed to pulsing the primary winding of the relay, the system is compatible with the test equipment normally associated with orginating registers, such as a #5 Crossbar Originating Register. Further the operation of the pulsing circuit is automatic. That is, the pulsing circuit automatically couples the DTMF receiver to the L-relay contacts when DTMF signals are received. Automatic coupling is achieved without any detrimental effect on the normal operation of the L-relay. That is, the tip and ring lines can carry either rotary dial pulses, or DTMF signals. The nature of the received information determines whether the L-relay is pulsed in a normal manner (i.e., by a rotary dial telephone) or whether the DTMF receiver outpulses a series of pulses during a conversion sequence and these pulses are automatically used to control the open circuit and grounded states of the L-relay terminals via the pulsing circuit. Regardless of the nature of the received dialing information, the method of producing the L-relay contact information is automatic, i.e., occurs without requiring a subsystem be switched in or out of the originating register system.

BRIEF DESCRIPTION OF THE DRAWINGS

The foregoing objects and many of the attendant advantages of this invention will become more readily appreciated as the same becomes better understood by reference to the following detailed description when taken in conjunction with the single FIGURE, which is an electrical schematic diagram illustrating a preferred embodiment of the invention.

DESCRIPTION OF THE PREFERRED EMBODIMENT

The embodiment of the invention illustrated in the FIGURE comprises: a pulsing circuit 11; an L-relay 13; an adaptor connector 15; an L-relay socket 17; and, a DTMF receiver 19.

For purposes of discussion, only the input and output terminals of the DTMF receiver pertinent to the operation of the present invention are illustrated. Nonrelevant terminals are not shown. In this regard, the DTMF receiver is bridge connected to the tip and ring lines of the originating register with which the invention is associated so as to detect when dual tone multifrequency (DTMF) signals are being applied to the originating register subsequent to the originating register being enabled. In this regard, as will be readily appreciated by those skilled in the telephone art, a central office includes a plurality of originating registers. An available register is enabled when an incoming call is received. The enabled register then receives the dialed information, as it is dialed. The dialed information may be in the form of DTMF signals or in the form of rotary dial pulses. The inclusion of a DTMF receiver allows an originating register that previously only responded to rotary dial pulses to also respond to DTMF signals.

The DTMF receiver 19 is enabled when an OFF HOOK signal, received from the pulsing circuit and originated by the L-relay contacts in the manner hereinafter described, goes high. (As will be readily understood by those familar with telephone communication systems a "high" signal, or state of a signal, is ground whereas a "low" signal, or state of a signal, is a negative value of some predetermined level, e.g., 48 volts, based on power source and circuit component values.)

The DTMF receiver 19 produces an output signal denoted DP BRK. DP BRK stands for dial pulse break. DP BRK is low (negative) when the DTMF receiver is idle. When the DTMF receiver receives a valid DTMF signal it produces a series of positive going pulses, equal in number to the digital equivalent of the tones making up the valid DTMF signal. Since the operation of DTMF receivers is well known, such operation will not be described in detail here.

The pulsing circuit 11 comprises: an invertor designated I; four resistors designated R1, R2, R3 and R4; four diodes designated D1, D2, D3 and D4; four PNP transistor designated Q1, Q2, Q3 and Q4; and, two suppressors designated S1 and S2, which may take the form of metal oxide varistors, for example.

The DP BRK output of the DTMF receiver (which is denoted BREAK inside of the pulsing circuit) is connected to one end of R1. The other end of R1 is connected to the cathode of D1. The anode of D1 is connected to the base of Q1. The collector of Q1 is connected through S1 to ground and to the collector Q2. The emitter of Q1 is connected to the base of Q2 and one end of R2. The other end of R2 is connected to the emitter of Q2 and to the anode of D2. The cathode of D2 is connected to the enable input of the DTMF receiver 19. Thus, the signal on the cathode of D2 is the OFF HOOK signal previously described.

DP BRK output of the DTMF receiver is also connected to the input of I. The output of I is a signal denoted MAKE. This signal is applied through R3 to the cathode of D3. The anode of D3 is connected to the base of Q3. The collector of Q3 is connected to the anode of D4, the collector of Q4 and through S2 to ground. The emitter of Q3 is connected to the base of Q4 and to one end of R4. The other end of R4 is connected to ground. The emitter of Q4 is also connected to ground.

As will be understood from this discussion, Q1 and Q2 form a first solid state grounding switch; and, Q3 and Q4 form a second solid state grounding switch. These switches are always in alternate states (e.g., open or closed) because MAKE AND BREAK are complementary signals.

The L-relay 13 comprises: a plurality of windings; a single wiper or movable element designated K; a pair of normally open contacts designated K1 and K2; and a pair of normally closed contacts designated K3 and K4. The L-relay windings include: a primary winding designated P; a secondary designated S; and, a tertiary winding designated T. The wiper K, when the primary winding P of the L-relay is de-energized is connected to the normally closed contacts K3 and K4. When the primary winding of the L-relay is energized, the wiper K is connected to the normally open terminals K1 and K2.

Normally, an L-relay is a plug-in relay, even though it may take other forms. In any event, the illustrated L-relay has 11 plug terminals designated 1-11. Plug terminals 1-5 are connected to the wiper and the normally open and normally closed contacts. Plug terminals 6-11 are connected to the primary P, secondary S and tertiary T windings. More specifically, the wiper K is connected to plug terminal 3; one normally closed contact K4 is connected to plug terminal 4; the other normally closed contact K3 is connected to plug terminal 5; one normally contact K2 is connected to plug terminal 2; and, the other normally open contact is connected to plug terminal 1. The primary winding P is connected to plug terminals 10 and 11; the secondary winding is connected to plug terminals 8 and 9; and, the tertiary winding T is connected to plug terminal 6 and 7.

The L-relay socket 17 includes 11 socket terminals designated 1-11 that correspond to the plug terminals 1-11 of the L-relay. Socket terminal 3 is connected to ground; socket terminal 5 is connected (through other relay contacts) to the ground side of the primary winding of a register advance (RA) relay; socket terminal 4 is connected (through other relay contacts) to the ground side of the primary winding of relay P1 of a pulse counting chain; socket terminal 2 is connected (through other relay contacts) to the ground side of the winding of relay P2 of the pulse counting chain; and, socket terminal 1 is connected (through other relay contacts) to the ground side of the winding of a supervisory (SR) relay and the negative (-) terminal of the secondary winding of the L-relay. As will readily appreciated by those skilled in the telephone art, the foregoing connections are conventional and relate to the connection of the L-relay socket in a #5 Crossbar Originating Register. In this regard the register advance (RA) relay is a fast actuating, slow release relay. The release of this relay causes the transfer of data counted by the counting chain relays from those relays to a suitable register. As will be better understood from the following discussion, the registers advance relay is actuated upon the receipt of a first dial pulse by the primary winding of the L-relay or by the production of a first BREAK pulse by the pulsing circuit in response to a DTMF receiver pulse. The register advance relay remains actuated until the last pulse of a series of digit pulses occurs (regardless of the source of these pulses). After the last pulse has occurred, during the interdigit time period, the register advance relay is released and data is transferred from the pulse counter relay chain to a suitable storage register.

As will also be better understood from the following description, the pulses counted by the counter are produced at the P1/P2 terminals, either by the pulsing circuit or by the application of dial pulses to the primary winding of the L-relay. A series of P1/P2 pulses counted by the pulse counter relay chain represent a digit. It is this pulse count, that is transferred when the register advance relay is released, as previously described.

The supervisory relay (SR) is a slow release relay that is actuated when the L-relay is actuated due to a subscriber going OFF HOOK and the originating register is seized. The supervisory relay remains actuated until a subscriber, connected to the tip and ring lines which connect to the primary winding of the L-relay, goes ON HOOK. More specifically, a predetermined time period after ON HOOK occurs, the slow release supervisory relay returns to its quiescent (de-energized) state. As will be readily understood by those skilled in the telephone art, during the period of time that the L-relay is pulsed by dial type pulses, the slow releases relay remains actuated.

Socket terminal 6 is connected to a voltage source designated −V1. Socket terminal 7 is connected to one side of a capacitor PH. The other side of PH is connected to socket terminal 8. Socket terminal 8 is selectively connected to ground via terminals 1 and 3 of the L-relay, as denoted by the designation GD1/3. Socket terminal 9 is connected to −V1 via a suitable resistor, as denoted by the designation −V1/R. Socket terminal 10 is connected to −V1 via suitable relay contacts. And, socket terminal 11 is connected to the tone coil, which is connected in series with the tip and ring lines, as denoted by the designation TC. Since the functional operation of the L-relay windings as a result of these connections is well known to those in the telephone art, such operations will not be described here.

The adapter connector 15 is mounted between the L-relay 13 and the L-relay socket 17. Assuming the L-relay is a plug in relay, the adaptor connector includes male and female elements. The female element or socket is adapted to receive the plug terminals of the L-relay and the male element or plug adapted to plug into the L-relay socket 17. A preferred embodiment of an adapter connector is described in a companion patent application Ser. No. 848,822 entitled "Offset Adapter Connector" by Ray Ma et al., filed concurrently herewith on Nov. 7, 1977. Reference is hereby made to this application for a more detailed description of the structural nature of a suitable adapter connector. The information contained in this application is incorporated herein by reference.

The adapter connector 15 includes a plurality of wires that connect the L-relay plug terminals to the L-relay socket terminals and these plug terminals to the pulsing circuit 11 in the manner hereinafter described. In this regard, plug terminals 1, 3, 4, 5, 6, 7, 8, 9, 10 and 11 of the L-relay 13 are directly wired to corresponding socket terminals 1, 3, 4, 5, 6, 7, 8, 9, 10 and 11 of the L-relay socket 17. In addition, the wire running between plug terminal 3 and socket terminal 3 is connected to the pulsing circuit and forms the group ground reference. The wire running between plug terminal 6 and socket terminal 6 is connected to the DTMF receiver 19 and forms the −V1 supply voltage. The wire running between plug terminal 4 and socket terminal 4 is connected to the cathode of D4. The wire running between plug terminal 5 and socket terminal 5 is connected to the collectors of Q3 and Q4. Finally, plug terminal 2 of the L-relay is connected to the emitter of Q2; and, socket terminal 2 of the L-relay socket is connected to the collector of Q2.

It will be appreciated from the foregoing description that the solid state switch formed by Q1 and Q2 of the pulsing circuit 11 is connected in series with the L-relay wiper K and relay contact K2. Conversely, the solid state switch formed by Q3 and Q4 is connected in parallel with the L-relay wiper and contacts K3 and K4. As a result, the switches are adapted to simulate the function of the movement of the wiper K of the L-relay as far as such movement effects signals on the P1, P2 and RA terminals of the L-relay socket. However, the effect of wiper movement on the signal on terminal SR is not simulated.

In normal (i.e., rotary dial) operation, during idle the primary winding P of the L-relay is de-energized. When the associated originating register is selected and a subscriber's line (with an OFF-HOOK telephone) is connected to the originating register, the primary winding is energized. As a result, K3 and K4 become open circuited and K1 and K2 become grounded. At this time the register advance (RA) relay is de-energized and the supervisory (SR) relay is energized. The first dial pulse de-energizes the primary winding of the L-relay. As a result the fast acting register advance relay is actuated. This relay, because it is a slow release relay, remains actuated until the end of the digit pulse series. For the same reason the supervisory relay is not de-energized each time a pulse temporarily de-energizes the L-relay. At the end of the first dial pulse the primary winding of the L-relay is energized. The start of the next dial pulse again de-energizes the primary winding. The alternate de-energization/energization of the primary winding of the L-relay continues until the series of pulses related to the first digit ends. This pulse series, is counted by the pulse counter relay chain as its P1 and P2 inputs switch back and forth. After the last digit related pulse occurs, the primary winding of the L-relay remains energized. As a result, after its release period has elapsed the register advance relay releases and the pulse count is transferred from the pulse counter relay chain to a register. This action occurs during the interdigit time period. When the next digit series of pulses occur this entire cycle is repeated. During the entire dialing sequence (and any subsequent conversation period) the supervisory relay remains actuated. A predetermined period of time after the subscriber goes ON HOOK (whereby the L-relay is released) the supervisory relay is released.

In summary, the L-relay is energized when the originating register with which it is associated is selected and an OFF HOOK signal is sensed on the tip and ring lines. Each dial pulse produced when the subscribers rotary dial telephone is actuated causes the L-relay to be temporarily de-energized, whereby the wiper K switches from a position whereat it grounds K1 and K2 to a position whereat the wiper grounds K3 and K4. At the end of the dial pulse, the L-relay is re-energized and the wiper returns to the position whereat K1 and K2 are grounded and K3 and K4 are open circuited. Because the L-relay is energized during the interdigit time period, the supervisory relay is not released, whereas the register advance relay is released to cause the transfer of data from a dial pulse counter (relay chain) to a suitable register.

Turning now to a discussion of the operation of the pulsing circuit, which simulates the operation of certain aspects of the L-relay, in response to the receipt of DTMF signals produced DP BRK pulses. As soon as the originating register is selected, the OFF HOOK status of the subscribers telephone causes the L-relay to be energized. As a result, K1 and K2 are grounded. The ground signal at K2 is a high signal that is denoted OFF HOOK. The OFF HOOK high passes through D2 to the enable input of the DTMF receiver 19. The DP BRK output of the DTMF receiver is normally low, thus, Q1 and Q2 are normally enabled. Because Q1 and Q2 are enabled, the ground signal at the emitters of Q1 and Q2 will appear at the collectors of Q1 and Q2. This action occurs each time the originating register is selected, regardless of whether the subscriber's telephone is a rotary dial or a DTMF telephone. If the telephone is a rotary dial telephone, plug terminal 2 of the L-relay is connected directly to socket terminal 2 of the L-relay socket via the enabled Q1/Q2 switch. As a result, the system handles rotary dial pulses in exactly the same manner as if the pulsing circuit were not included. That is, the system automatically operates exactly as described above.

Turning now to the discussion of the operation of the pulsing circuit upon the receipt of a valid DTMF signal. Upon the receipt of a valid DTMF signal, the DTMF receiver 19 converts the dual tones into a series of rotary dial type pulses. These pulses cause the complementary MAKE and BREAK signals to shift between high and low values. During these shifts the L-relay remains energized, because the presence of DTMF signals on the tip and ring lines does not create an L-relay de-energizing break similar to the breaks that occur when rotary dial pulses are produced.

Each time BREAK goes high Q1 and Q2 are turned off (disabled), whereby the connection between plug terminal 2 of the L-relay and socket terminal 2 of the L-relay socket is, in essence, open circuited and the ground connectin to P2 removed. As MAKE simultaneously goes low, Q3 and Q4 are turned on (enabled). As a result, plug and socket terminals 4 and 5 are grounded. At the end of each rotary dial type pulse produced by the DTMF receiver, MAKE and BREAK return to their quiescent states i.e., BREAK goes low and MAKE goes high. In this manner the P1, P2 and RA socket terminals are pulsed in the same manner that they are pulsed when rotary dial pulses energize and de-energize the primary winding of the L-relay. The only difference is that the DTMF receiver produced pulses can occur at a rate substantially faster than the normal rotary dial pulses rate, without having any undesirable effect on other circuitry. Again, the first pulse of a digit sequence causes the register advance relay to be actuated. At the end of a series of digit related pulses, during the interdigit time period, the register advance relay is released and the pulse count is transferred from the pulse counters to a suitable register, as previously described.

Because the supervisory relay remains actuated throughout the entire sequence, no undesirable clicking or popping occurs on the line. In this regard, it has been found that such pops will occur if the supervisory relay is pulsed at the same time the count terminals (P1, P2 and RA) are pulsed. This popping or clicking is not heard by the subscriber when rotary dial pulses are formed on the tip and ring wires by a rotary dial telephone due to the telephone earpiece being shunted during rotary dial off-normal periods. However, popping or clicking will be heard during DTMF pulse production, if the supervisory relay is pulsed because the earpiece of the DTMF telephone is not shunted during rotary pulse simulation.

It will be appreciated from the foregoing description that the invention provides a pulsing circuit suitable for use with originating registers so that the originating register will accept DTMF signals as well as rotary dial pulses. The operation of the invention is automatic in that either DTMF or rotary dial pulse digit signals can be received and forwarded to counting circuitry without any need to recognize signal type and switch between two alternate systems. The pulsing circuit of the invention does not reproduce all of the functions of the contacts of the L-relay. Rather, the invention only simulates those functions necessary to the operation of the pulse counting portion of the originating register with which the L-relay is associated. Hence, undesirable effects that occur when the functions of all of the contacts of the L-relay are simulated do not occur.

While a preferred embodiment of the invention has been illustrated and described, it will be appreciated that various changes can be made therein without departing from the spirit and scope of the invention. For example, in some environments, a single transistor switch, as opposed to Darlington transistor switches, can be used to form the pulsing circuit. Alternatively, other types of semiconductor switches can be utilized, if desired. Hence, the invention can be practiced otherwise than as specifically described herein.

The embodiments of the invention in which an exclusive property or privilege is claimed are defined as follows:

1. In telephone equipment, such as an originating register, including a relay for creating pulses, suitable for counting by a pulse counter, in response to rotary dial pulses by grounding and open circuiting the counting terminals of said relay connected to the wiper and wiper contacts of said relay, the improvement comprising a solid state pulsing apparatus for receiving pulses produced by a DTMF receiver in response to the receipt of valid DTMF signals and pulsing only the counting terminals of the relay in accordance therewith by grounding and open circuiting said counting terminals, said solid state pulsing apparatus comprising:
   a solid state pulsing circuit including first and second solid state grounding switches for selectively grounding and open circuiting said counting terminals of said relay, said first solid state grounding switch connected to said DTMF receiver such that said first solid state grounding switch is disabled when a pulse is produced by said DTMF receiver and is enabled in the absence of the production of a pulse by said DTMF receiver, said second solid state grounding switch connected to said DTMF receiver such that said second solid state grounding switch is enabled when a pulse is produced by said DTMF receiver and is disabled in the absence of the production of a pulse by said DTMF receiver; and,
   an adapter connector for selectively connecting said first and second solid state grounding switches to the counting terminals only of said L-relay so that said counting terminals are grounded and open circuited in accordance with the enable/disable state of said first and second solid state grounding switches.

2. The improvement claimed in claim 1 wherein said first solid state grounding switch is connected in series with the wiper and a selected one of the wiper contacts of said relay and said second solid state grounding switch is connected in parallel with the wiper and a selected one of the wiper contacts of said relay, said selected ones of said wiper contacts being those adapted to create pulses for counting by said pulse counter.

3. The improvement claimed n claim 2 wherein said first and second solid state grounding switches are transistor switches.

4. A solid state pulsing apparatus for pulsing the register advance and pulse counting terminals only of an L-relay of an originating register in response to a series of pulses produced by a DTMF receiver comprising:
   a solid state pulsing circuit including first and second solid state grounding switches for selectively grounding and open circuiting the register advance and pulse counting terminals of an L-relay, said first and second solid state grounding switches being enabled and disabled in a complementary manner upon the receipt of a series of pulses by said solid state pulsing circuit; and,
   an adapter connector for selectively connecting: said first solid state grounding switch between a normally grounded pulse counting terminal of an L-relay and ground; and, said second solid state grounding switch between a normally open pulse counting terminal and the register advance terminal of said L-relay, and ground.

5. The solid state pulsing apparatus claimed in claim 4 wherein said adapter connector connects: said first solid state grounding switch in series with the wiper and a normally grounded pulse counting wiper contact of said relay; and, said second solid state grounding switch in parallel with the wiper and both a normally open pulse counting wiper contact and the register advance contact of said relay.

6. The solid state pulsing apparatus claimed in claim 6 wherein said first and second solid state grounding switches are transistor switches.

7. In telephone equipment, such as an originating register, including a relay for creating pulses, suitable for: (a) counting by a pulse counter, in response to rotary dial pulses by grounding and open circuiting the counting terminals of said relay connected to the wiper and wiper contacts of said relay; and, (b) transferring pulse counts made by said pulse counter to a storage register by grounding and open circuiting a register advance terminal connected to a wiper contact of said relay, the improvement comprising a solid state pulsing apparatus for receiving pulses produced by a DTMF receiver in response to the receipt of valid DTMF signals, and pulsing only the counting and register advance terminals of the relay in accordance therewith by grounding and open circuiting said counting and register advance terminals, said solid state pulsing apparatus comprising:
   a solid state pulsing circuit including first and second solid state grounding switches for selectively grounding and open circuiting said counting and register advance terminals of said relay, said first solid state grounding switch connected to said DTMF receiver such that said first solid state grounding switch is disabled when a pulse is produced by said DTMF receiver and is enabled in the absence of the production of a pulse by said DTMF receiver, said second solid state grounding switch connected to said DTMF receiver such that said second solid state grounding switch is enabled when a pulse is produced by said DTMF receiver and is disabled in the absence of the production of a pulse by said DTMF receiver; and,
   an adapter connector for selectively connecting said first and second solid state grounding switches to the counting and register advance terminals only of said L-relay so that said counting and register advance terminals are grounded and open circuited in accordance with the enable/disable state of said first and second solid state grounding switches.

8. The improvement claimed in claim 7 wherein said first solid state grounding switch is connected in series with the wiper and a selected one of the counting contacts of said relay and said second solid state grounding switch is connected in parallel with the wiper and both a selected one of the counting contacts of said relay and the register advance contact of said relay.

9. The improvement claimed in claim 8 wherein said first and second solid state grounding switches are transistor switches.

* * * * *

UNITED STATES PATENT AND TRADEMARK OFFICE
CERTIFICATE OF CORRECTION

PATENT NO. : 4,146,751
DATED : March 27, 1979
INVENTOR(S) : Ma, Raymond

It is certified that error appears in the above-identified patent and that said Letters Patent are hereby corrected as shown below:

Col. 1, line 9, delete "orginating" and insert —originating—.

Col. 2, line 40, delete "in" and insert —is—.

Col. 3, line 18, delete "orginating" and insert —originating—.

Col. 5, line 11, after "normally" insert —open—.

Col. 8, line 22, delete "connectin" and insert —connection—.

Col. 9, line 57 (Claim 3, line 1), delete "n" and insert —in—.

Signed and Sealed this

Thirtieth Day of October 1979

[SEAL]

Attest:

RUTH C. MASON
Attesting Officer

LUTRELLE F. PARKER
Acting Commissioner of Patents and Trademarks